United States Patent [19]
Lee et al.

[11] Patent Number: 5,361,308
[45] Date of Patent: Nov. 1, 1994

[54] 3-D MEASUREMENT OF CUTTING TOOL WEAR

[75] Inventors: Yong H. Lee; Raghunath P. Khetan, both of Troy; Don R. Sutherland, Romeo, all of Mich.

[73] Assignee: General Motors Corporation, Detroit, Mich.

[21] Appl. No.: 818,940

[22] Filed: Jan. 10, 1992

[51] Int. Cl.$^5$ .......... G06K 9/00; G01B 11/02; G06F 15/46; G06G 7/64
[52] U.S. Cl. .......... 382/8; 382/26; 348/131; 356/358; 364/474.12; 364/551.02
[58] Field of Search .......... 382/8, 1, 21, 22, 26; 358/101, 106, 96, 88; 73/104; 356/237, 358; 395/119, 120; 250/563, 559; 364/474.17, 474.05, 474.31, 413.18, 413.19, 551.02, 564; 72/32, 35; 348/86, 131; H04N 7/00, 7/18, 13/00

[56] References Cited

U.S. PATENT DOCUMENTS

| | | | |
|---|---|---|---|
| 4,525,858 | 6/1985 | Cline et al. | 382/1 |
| 4,659,937 | 4/1987 | Cielo et al. | 250/560 |
| 4,700,224 | 10/1987 | Miyasaka et al. | 358/101 |
| 4,742,237 | 5/1988 | Ozawa | 250/560 |
| 4,744,242 | 5/1988 | Anderson et al. | 73/104 |
| 4,837,732 | 6/1989 | Brandestini et al. | 364/413.28 |
| 4,845,763 | 7/1989 | Bandyopadhyay et al. | 382/8 |
| 4,874,955 | 10/1989 | Uesugi et al. | 250/550 |
| 4,952,149 | 8/1990 | Duret et al. | 433/215 |
| 5,148,372 | 9/1992 | Maiocco et al. | 364/474.24 |
| 5,159,361 | 10/1992 | Cambier et al. | 351/212 |
| 5,175,601 | 12/1992 | Fitts | 356/376 |
| 5,243,665 | 9/1993 | Maney et al. | 382/8 |

Primary Examiner—David K. Moore
Assistant Examiner—Michael Cammarata
Attorney, Agent, or Firm—Howard N. Conkey

[57] ABSTRACT

The profile of a tool or other object having a flat reference plane is illuminated by interfering beams of coherent light to generate a striped light pattern which at any point deviates from straight lines as a function of the surface spacing from the reference plane. A camera image of the pattern taken at an angle to the beams is processed by an image analysis program which converts the stripes to lines corresponding to light peaks and valleys of the pattern. Tool wear or object profile is determined from the deviation of lines from straight reference lines. The program includes algorithms for identifying peak and valley line segments, determining the segments which are neighbors of other segments, and connecting lines according to a set of rules and constraints which use the data on neighbor segments and the proximity of segment end points.

12 Claims, 7 Drawing Sheets

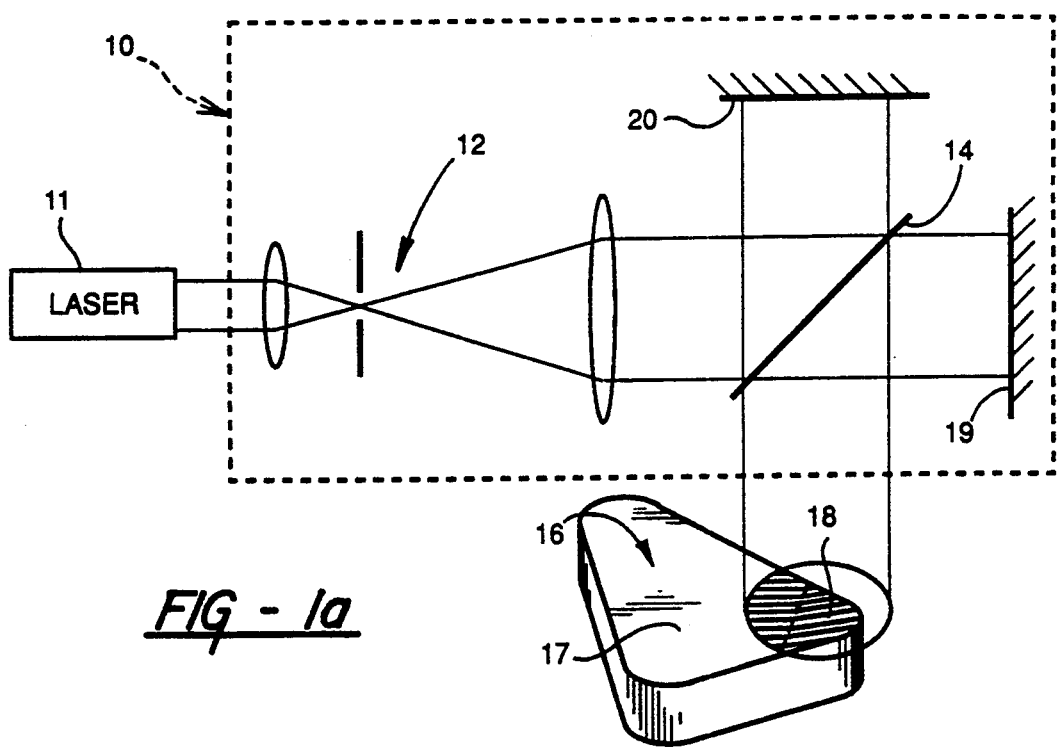
FIG - 1a
FIG - 1b
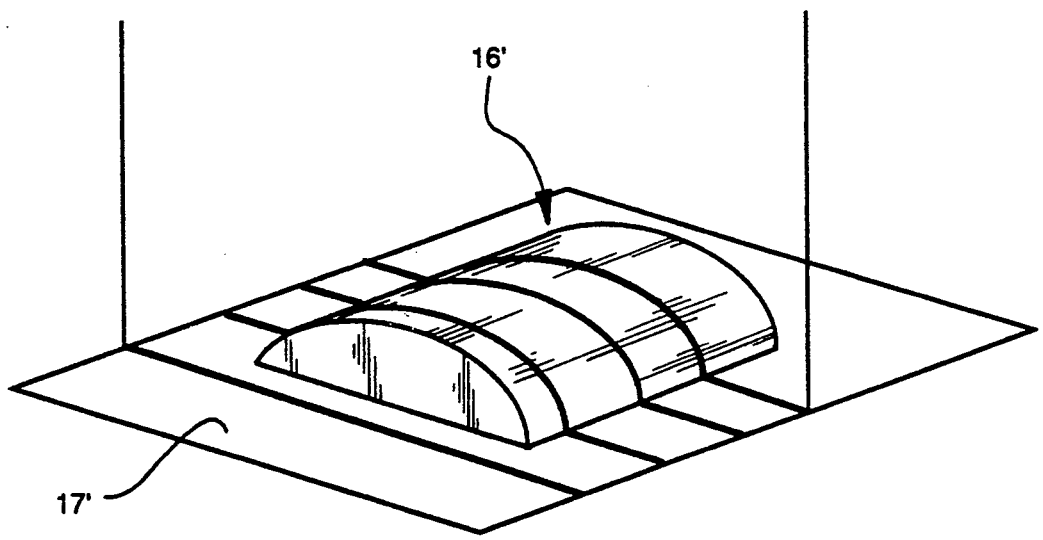

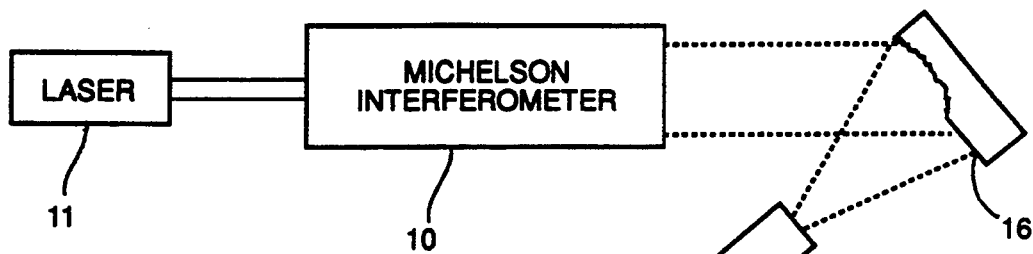
*FIG-2*
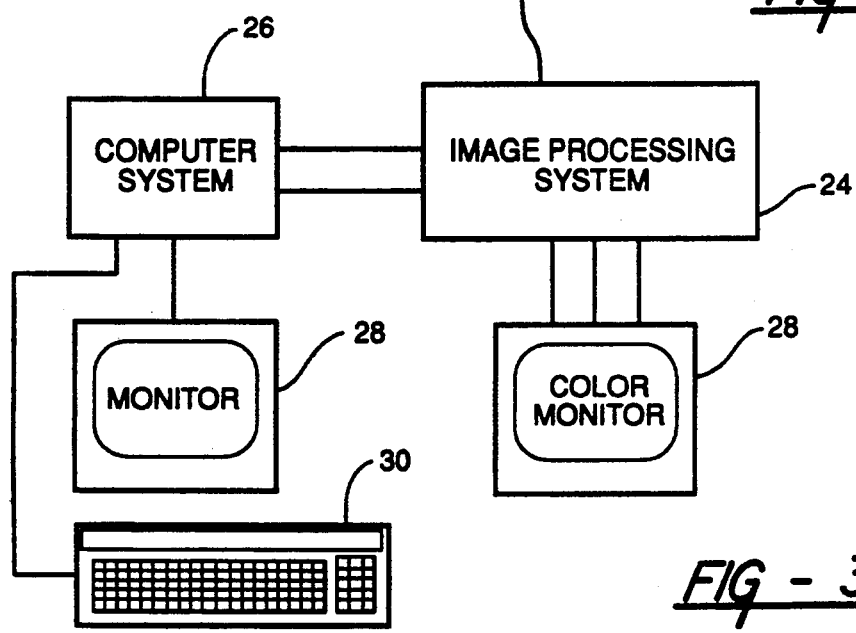
*FIG-3*
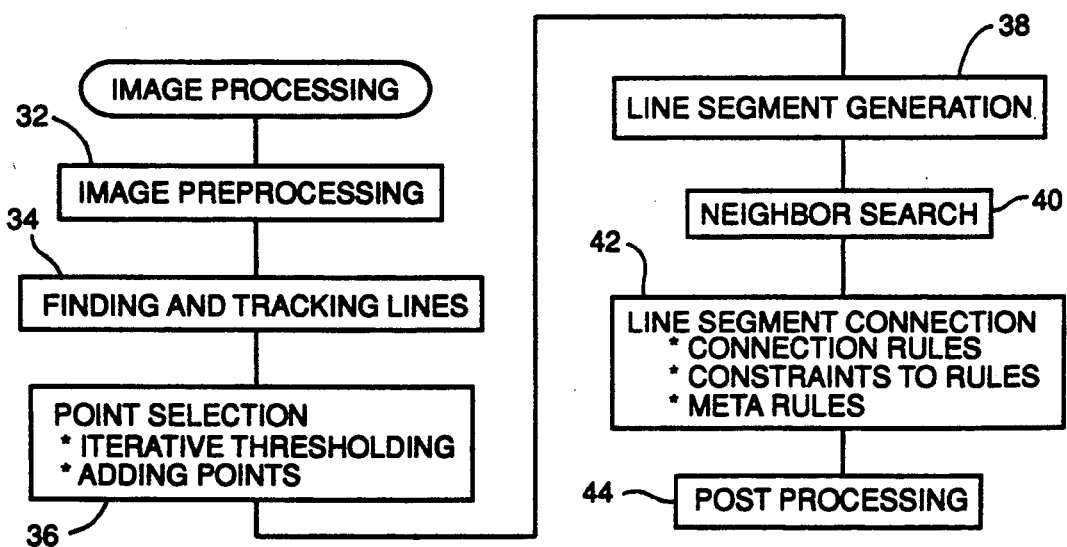

——————— "ORIGINALLY EXISTING" LINE
—·—·—·— "CREATED IN CONNECTION" LINE
— — — — FINAL READJUSTED LINE

3-D MEASUREMENT OF CUTTING TOOL WEAR

FIELD OF THE INVENTION

This invention relates to the method of three dimensional measurement of object profiles using machine vision techniques and particularly as applied to the measurement of cutting tool wear.

BACKGROUND OF THE INVENTION

Tool wear has been extensively studied by the machine tool industry and academia for over 50 years. In general, research has focused on correlating tool wear with machining signals, mainly cutting forces, tool vibration, and cutting temperature, to provide the necessary process information needed for the development of intelligent unmanned machining systems. Although these machining signals can be easily measured, an accurate correlation of machining signals to tool wear has not been possible.

During machining, the failure of a cutting tool is caused by wear due to the interactions between the tool and the workpiece (flank wear) and between the tool and the chip (crater wear). Guidelines and specifications for flank and crater wear measurement are available in machining handbooks. Traditionally, these small wear parameters are measured under laboratory conditions, using a toolmaker's microscope. However, these measurements provide a limited definition of the wear of a cutting edge. Tool wear is not simple in nature and because of the irregular boundaries and the varying surface textures, the flank and crater wear boundaries are difficult to define. As a result, measurements of the width or length of flank and crater wear contours are only approximations and are not repeatable because of measurement error. Moreover, it has been recognized by those skilled in the art that the area and eroded volume of a wear region are more relevant parameters for quantifying tool wear, but there has been no practical, accurate method for such measurements, particularly for tools installed in machines.

The U.S. Pat. No. 4,845,743 to Bandyopadhyay et al entitled "Tool Wear Measurements by Machine Vision" documents a response to that need by using machine vision to measure the area of tool wear. In that development image analysis is based on an interactive procedure using a general purpose image processing system. The present invention goes further by measuring wear volume as well as area, and accomplishes the measurement between machining processes in an unattended machining cell. The invention is not limited to tool measurements and has general application to the three dimensional measurement of object profiles using structured light patterns and image analysis algorithms. The application of a structured stripe pattern to extract three-dimensional information is well known. However, the success of the method hinges on tracking of the lines in the input image. In many cases, noise resulting from shadows, glares, surface texture, magnification, and light conditions make it too difficult to get a good image for accurate tracking.

SUMMARY OF THE INVENTION

It is therefore an object of the invention to provide a method for the three dimensional measurement of object profiles. A further object is to provide such a method which can be carried out without human interaction. Another object is to provide a machine vision method for the three dimensional measurement of tool wear.

The invention is carried out by the method of measuring the three dimensional profile of a contoured object relative to a reference plane comprising the steps of: projecting stripes of light onto the surface of the object and the reference plane at a first angle to illuminate the object as well as the plane; sensing an image of the stripes from a second angle whereby the image comprises unconnected line segments due to noise, constructing from the line segments complete lines extending across the object and the reference plane whereby in the image the lines on the object are locally displaced as a function of the distance from the reference plane; calculating reference lines in the object by extrapolating from the lines on the reference plane; and measuring the displacement of the lines in the object from the calculated reference lines to extract profile information.

The invention is further carried out by structured lighting techniques especially adapted to the measurement of very small objects such as tool bits and by specialized algorithms for processing images containing light stripes to obtain three dimensional information about the object shape or specifically tool wear.

BRIEF DESCRIPTION OF THE DRAWINGS

The above and other advantages of the invention will become more apparent from the following description taken in conjunction with the accompanying drawings wherein like references refer to like parts and wherein:

FIG. 1a is a schematic diagram of a structured light source and illuminated object for use in the measuring system used to carry out the invention;

FIG. 1b is a view of an object and a reference plane illuminated by the source of FIG. 1a;

FIG. 2 is a schematic diagram of an imaging and image analysis system for carrying out the tool wear measurement of the invention;

FIG. 3 is a flow chart summary of the image processing steps according to the invention;

DESCRIPTION OF THE INVENTION

Figure 4A:
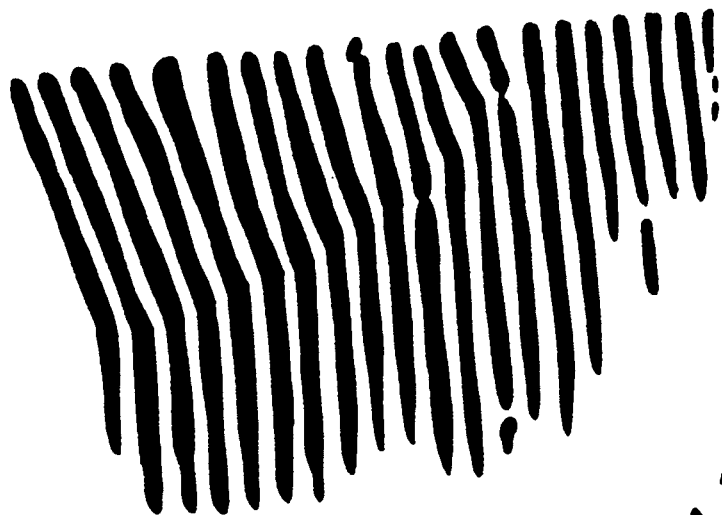
FIGS. 4a and 4b are tool wear images with a stripe pattern respectively exhibiting flank wear and crater wear.

We have developed a tool wear analysis method which measures wear parameters such as area and volume automatically and objectively. Thus, correlation between the wear parameters and tool performance is established. A monitoring system can utilize this method to check the condition of a tool in an unattended machining cell between machining processes.

An improved structured light system is proposed which projects stripes of light onto the tool surface. The system uses interference of two coherent beams and thus the stripe pattern varies sinusoidally in intensity. This system is especially useful, compared to other structured light schemes, for illuminating very small objects.

The algorithms developed apply the knowledge about the projected light stripes in processing the digitized image data to overcome the problems caused by a poor image. The threshold method uses information about the spacing of the stripes to restrict the search for intensity peaks (high intensity, light stripe) and valleys (low intensity, shadow) to those places where they must exist in order to retain the correct spacing of the fringe lines. A peak or valley point is recovered even when the local area intensities do not merit its selection if nearby points show that one must be chosen in its area. Initial line segments are generated by combining the peak and valley pixels using the adjacency rule. The segments are then connected together based on the fact that lines must not cross and neighbor lines remain at a relatively constant distance throughout the image. Also, the fact that peak lines and valley lines must alternate is intrinsically applied throughout.

Results obtained by applying the algorithms to the tool wear problem, where magnification is necessary and images are noisy, show that the new method can be successfully applied to sub-optimal images. Even in images where accurate tracking of all stripes is difficult or impossible, many of the main features are still captured in a 3-D model. Since this is a general image processing problem with a structured light, this method can be easily adapted to other applications besides the determination of tool wear.

Imaging System. The first important part of this process is obtaining a well focused image with little noise and with a high contrast between the light stripes and shadows. Various types of light projection schemes are known for illumination with a line pattern. For example, one might use a collimated beam of light that is adjusted to illuminate the necessary amount of space on the object, and a glass with spaced opaque stripes is placed in the path of the light. The success of this approach would depend on the size of the object being illuminated and the necessary depth of field. The image projection beam or the sensing optics or both must be at an angle to the surface of the object to obtain the depth information. Ideally each optical system would have a large depth of field so that a sharp line image could be projected and retrieved. As a practical matter some compromise is usually necessary since one or both of the systems may have depth of field limitations. The decision of whether to have the projection beam or the sensing optics at an angle to the surface depends on the particular apparatus being used.

It has been found to be useful when illuminating a tool bit or other small object to use the Michelson interferometer system shown in FIG. 1a as the striped pattern projection system. The Michelson interferometer 10 splits a coherent light beam into two paths of equal lengths and recombines the paths into a combined beam which produces a striped interference pattern on the object surface. Specifically, a laser 11 provides a coherent light beam to a collimator and beam expander 12 which then passes a beam of the desired size to a beam splitter 14 which passes a portion of the beam to a first mirror 19 and reflects a second portion of the beam to a second mirror 20. The first mirror 19 reflects the light via the beam splitter to the tool bit or other object 16 and the second mirror reflects the second portion through the beam splitter 14 such that the two portions of the beam are recombined. One of the mirrors is normal to the incident beam path and the other mirror is tilted a slight amount from such a normal attitude so that the two portions of the beam are likewise at a small angle to one another. As is well known, this setup in a Michelson interferometer produces a striped interference pattern with the number of lines in the beam dependent on the deviation of the one mirror from normal. The resulting striped pattern has a large depth of field, high contrast, a sinusoidal distribution, and lends to automated processing. This is particularly well suited for projecting stripes onto a small target and the number of stripes are readily adjusted by changing the mirror tilt. For the example given below, 100 stripes across a 10 mm diameter beam was found to be satisfactory.

Figure 4B:

At least a portion of the illuminated object 16 is a flat surface 17 and the lines have uniform slope and spacing. A worn surface 18 on the object has lines which deviate from the uniform lines when viewed at an angle to the illuminating beam. FIG. 1b depicts the case of an object 16' which does not have a flat surface but is resting on a flat reference surface 17'. The incident beam creates straight uniform lines on the reference surface 17' and nonuniform lines on the object 16' according to the contour of the object. The striped patterns of a tool bit 16 as imaged by a camera are shown as negatives of the pattern in FIGS. 4a and 4b for flank wear and crater wear, respectively, wherein straight and uniform stripe patterns signify the flat reference surface and bent or wavy lines are produced at worn portions.

Preferably, as shown in FIG. 2, the interfering light beams are projected at an angle to the tool 16 and a solid state CCD camera 22 facing normal to the surface of the tool senses an image of the striped pattern. Images taken with the camera 22 are digitized with a high performance image processor 24 made by Vicom Systems, Inc., Fremont, Calif. The camera resolution is 488×380 pixels and the digitized picture resolution is 8 bits and 480×512 pixels. A Sun Microsystems 3/260 computer system 26 which is the front end of the imaging system 24 allows the use of a Unix operating system and C software to process the image. Monitors 28 and keyboard 30 or other input devices are coupled to the systems 24, 26.

The method discussed here uses vertical stripes. A cutting tool 16 is positioned to face the camera 22. Then the stripes are projected onto the tool at an angle somewhere near 45°. It is assumed that there is a flat unworn area 17 of the tool 16 in the lower part of the image which the user could specify as a reference surface. This area is used as a starting point for tracking the stripes and for determining the slope and location of the lines on a flat surface. By comparing extrapolated reference line locations with the location where the line was actually found, an offset is computed and the depth at that point is determined.

From the offset data and depth information, the wear area and the volume worn away are computed. By using interpolation between stripes and shadows a smooth 3-D image of the tool can be generated. It can be compared with the actual object to check the general validity of the results.

Image Processing. The algorithms for processing the image are summarized in the flow chart of FIG. 3. The first step is image preprocessing (block 32) which filters and otherwise enhances the raw image. Then the method of finding and tracking the lines within the image is carried out (block 34) and includes the remaining steps of blocks 36, 38, 40, 42 and 44. In block 36 points are selected in each row for the light stripes and the intervening dark stripes using an iterative thresholding technique. For the designated reference area 17 missing points in the row are added. Line segments are generated (block 38) and for each line segment the neighbor lines are located (block 40). Then the line segments are connected end to end to form complete lines (block 42). This is accomplished by connection rules using the information about neighbor lines and the proximity of line segment ends, and constraints to the rules. A meta rule establishes the order of application of the connection rules. Finally, (block 44) some post processing is used to remove crossing lines and fill in missing points.

Image Preprocessing. Several preprocessing operations are performed on the image before starting to search for the stripes. Histogram scaling is applied to expand the range of intensity levels to fill the entire available range. For the transformation function, a simple linear ramp is used with two clip points. A program calculates the fractions for low clipping from the background and for high clipping from the object area. It roughly relates to clipping the entire background to 0.0 and taking the brightest 5% of the object to clip to 1.0. A vertical averaging filter is applied to smooth the image. Based on the assumption that all stripes are vertical or near vertical, a 1 by 7 simple averaging mask is used. Although the resulting image looks blurry, the improvement is that the stripes have a more even intensity and in practice the mask will not cloud the stripes together. It is important to arrive at a final horizontal intensity cross section that looks like a periodic sine or square wave. This filtering eliminates many spikes that may otherwise confuse the thresholding algorithm.

Finding and Tracking the Lines. Algorithms for finding the light stripes in an image start with the creation of a binary thresholded image. Since global or adaptive thresholding methods are not sufficient to extract stripes from a tool wear image, it is necessary to use extra knowledge about the image. Since the stripes are approximately vertical in the unworn region, it can be processed one row at a time using the average distance between lines to make intelligent decisions about where stripe points should be located. More information can be retained by creating a ternary image with background points, light stripe points (peaks), and shadow points (valleys). Furthermore, a valley point must exist between two consecutive peak points and vice versa. At the end, every stripe or shadow will be represented by a single point in each row it passes through. The technique which creates a new simpler image for further processing, corresponds closely to the human method of viewing a scene and then creating its own internal representation of what was seen.

Peak/Valley Point Selection Algorithm

Step 1: For each of the first 5 rows in the unworn region 17, create a binary threshold halfway between the minimum and maximum intensity values in the row to resolve the pattern into black and white stripes (1s and 0s).

Step 2: Find the distances between the starts of successive sequences of 1s. Take the median of these values in each row. Again take the median of the 5 resulting medians. This is the period.

The above steps find the average distance between consecutive lines. The user should specify a starting row near the bottom of the object where it is flat and all stripes exist. Any stripe not appearing in the starting row will not be present in the final output. Some of the peaks and valleys are not distinguished with this thresholding method, therefore taking the median of the distances between them is necessary to assure that the distance between two consecutive lines has been found. It is important that these steps take place in the flat area of the object in order to get an accurate result.

Step 3: For the rest of the image, initialize to the first row and a threshold level of 0.875.

Step 4: Threshold the row. Check each resulting sequence of is. If it is longer than 4 pixels, find its midpoint. Check to see if this position has been marked as a non-peak. If not, set it to be a peak point and mark the pixels within the half period on either side as non-peak points.

Step 5: Lower the threshold level by 0.0625. If it is greater than 0, go to Step 4.

These steps mark pixels on each row independently as peak points. Information about the spacing between lines is used intelligently to make sure two peaks are not selected too closely each other. This is facilitated by marking off the non-peak points around each newly found peak. As each new peak is identified, it is first checked to make sure that the pixel has not already been marked as a non-peak point.

Step 6: Repeat the Steps 3–5 with an initial threshold level of 0.125 that is raised 0.0625 at each iteration. This selects all of the valley points.

Step 7: Scan the peaks and valleys. Using the types and the distance for each pair of points, check if other points must be added. If so, space the new points evenly between the original ones. This makes sure that no points have been missed in a bad section of the row. Between each two points there exist two possible cases for inserting new points. The first case is that the two points are of opposite types. If the distance is far greater than the period dictates, an even number of additional points are added. The number to add is computed by the distance divided by the period. The new points are spaced evenly between the two original points. The second case is two points of the same type. Here at least one point must be added regardless of distance to retain the alternation of peak and valley points. If the distance is significantly greater than the period, the procedure is similar to the first case except that an odd number of points is added rather than an even number. The process of adding points is only used at the unworn region of the image to ensure all lines are accounted for. Extra lines can be created where the stripes really do separate due to the noise.

Step 8: If all peaks or valleys were found, move to the next row, reinitialize the threshold and go to Step 4; else create an image with all peak and valley points marked appropriately and exit.

Figure 5A:
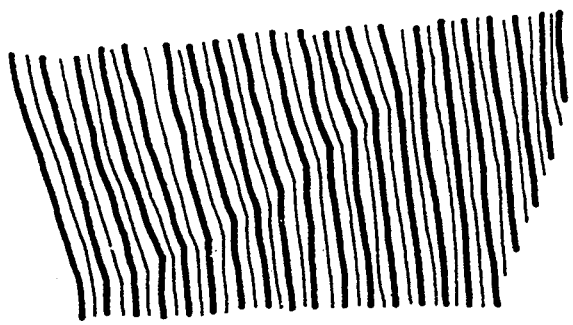
FIGS. 5a and 5b are processed line segment images corresponding to FIGS. 4a and 4b, respectively.
Figure 5B:
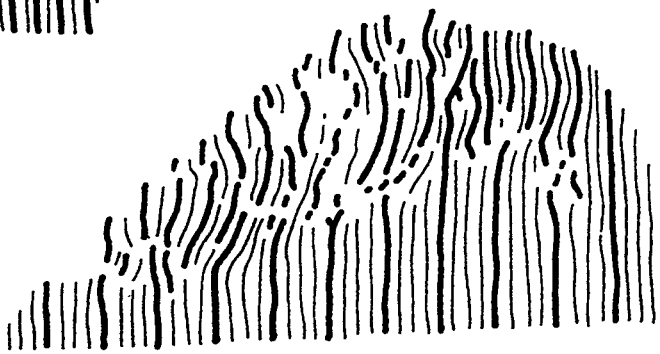

Line Segment Generation Algorithm. Next the points are combined into peak lines 'p' and valley lines 'v' as shown in FIGS. 5a and 5b. Initial line segments are created by combining strings of same type points using the well known 8-neighbors rule. That is, adjacent points in vertical, lateral and diagonal directions are included in the same string. The lines vary greatly in length, but there are generally long ones near the bottom where the object is flat. All lines beginning at the starting row are termed baselines 'b' and are considered to represent the start of every stripe and shadow in the image. All other lines will eventually be connected to a baseline or discarded.

Neighbor Search Algorithm. A function was developed to find all the neighbor lines of a given line. A neighbor line is the closest line of the correct type (peak or valley) either on the right or left of the current line. The algorithm runs in two modes to find a neighbor of the same type or the opposite type. The algorithm is given below.

Step 1: Initialize to the beginning of the input line.

Step 2: For each peak or valley point, scan to the left (for left neighbor) until a line of the correct type is encountered. The right neighbors are found in the same way.

Step 3: If the neighbor line is the same as that found in the previous row, update the number of times it has been found and its average distance from the original line. Go to Step 5.

Step 4: If the line found is different and the previous line has showed up more than 6 consecutive times, the previous line is a neighbor line. The current list of neighbors is scanned to see if it already exists. If not, it is added to the neighbor line list along with its average distance and the number of neighbor pixels. If it is already in the list, the two distance and number values are updated.

Thus as neighbor lines are recorded for each row, the appearance of a new neighbor line triggers a review of the previous one. If it has been neighbor for less than 6 rows it is simply discarded. Otherwise, the appropriate statistics are recorded for use by the rule functions in merging constraints.

Step 5: If there are more points in the input line, move to the next point and go to Step 2; else exit.

Line Segment Connection Rules. Rules were created to determine when a line segment should be connected to another. The rules center on the fact that the spacing between lines should remain relatively constant throughout the image and that the lines should each have only one left and one right neighbor at the end. Each rule is implemented as a function which attempts to make all the connections it can and returns a value telling whether any were made. Information needed by the rules is obtained from the function searching for neighbors. While the lines are being formed, each pixel is marked either "originally existing" or "created to make a connection." These labels will be used to make corrections after rules are applied. Following is a list of the rules used.

Figure 6A:
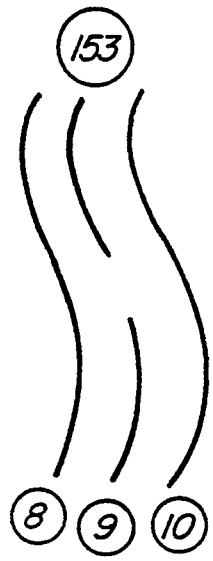
FIGS. 6a, 6b, 6c, and 6d are graphical illustrations of line segment connection rules used according to the invention.

Rule 1: Merge two lines if they have a common left neighbor and a common right neighbor. Example: in FIG. 6a, lines 9 and 153 both have 8 for a left neighbor and 10 for a right neighbor, so they should be connected.

Figure 6B:
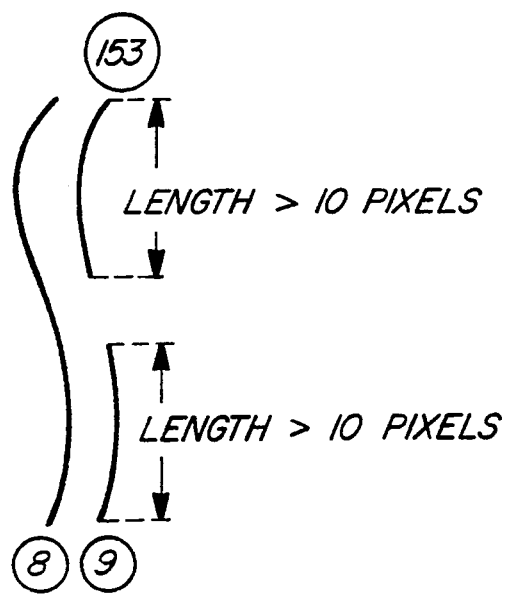

Rule 2: Merge two lines if they have a common left or right neighbor and both of the lines are longer than 10 pixels. Example: in FIG. 6b, lines 9 and 153 have only the left neighbor 8 in common, but they both have a length greater than 10 pixels, so they can be connected.

Figure 6C:
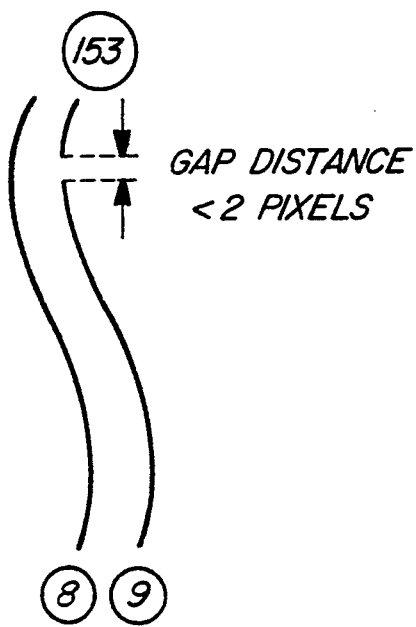

Rule 3: Merge two lines if they have a common left or right neighbor and the columns of their endpoints are 2 pixels or less apart. Example: in FIG. 6c, lines 9 and 153 have one common neighbor, but 153 is very short. However, since their endpoint are close they can still be connected.

Figure 6D:
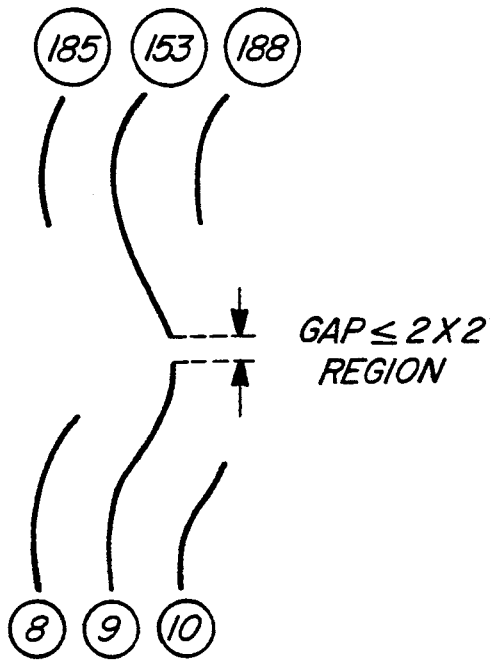

Rule 4: Merge two lines if their endpoints fall in a 2×2 pixel region, that is, if the endpoints are spaced by no more than 2 rows and/or two columns of pixels the lines are merged. This rule is applied only once as shown in the meta rule. Example: in FIG. 6d, lines 9 and 153 have no common neighbors, but their endpoints are within the 2×2 region.

Constraints. There are additional constraints which are applied to certain rules as indicated:

1. Lines must be of the same type. (All rules)

Figure 7A:
FIGS. 7a, 7b, 7c, 7d, and 7e are graphical illustrations of constraints of the line segment rules according to the invention.

2. The ending point of the first line can not overlap the starting point of the second by more than 4 pixels. Example: in FIG. 7a, lines 9 and 153 cannot be connected because of overlap. Probably some other line was missed between 153 and 8 that should be the real connection to 9. (Rule 1 & 2).

Figure 7B:
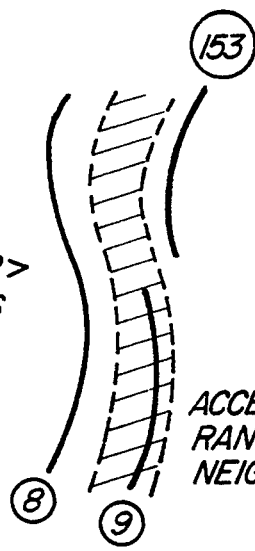
Figure 7C:
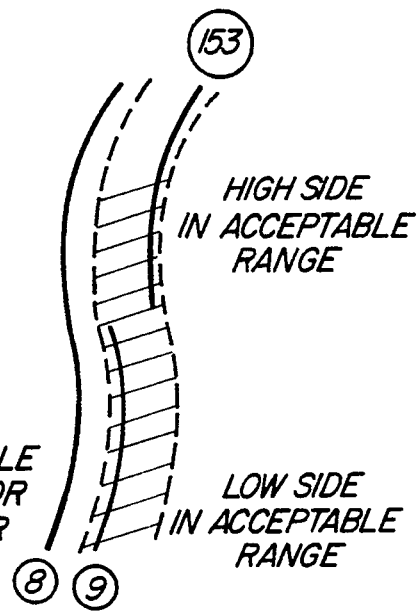

3. The distance between each line and its neighbors must be within a certain range of the period computed above and must be similar. Examples: in FIG. 7b, line 153 is outside the acceptable range. In FIG. 7c, 9 and 153 are within the range, but at opposite sides of it. There may be missed lines. (Rules 2 & 3).

Figure 7D:
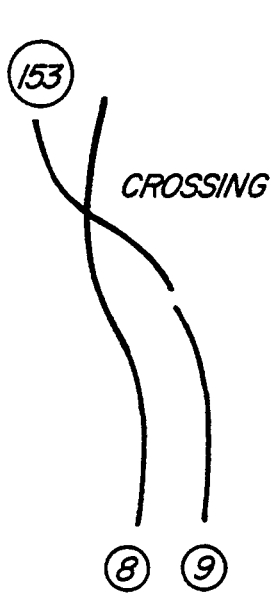

4. The connection will not cause a large amount of crossing between lines. It is necessary to allow temporary crossings since it can happen when a straight line connection is made over a curved area. The temporary crossing is corrected later. Example: in FIG. 7d, line 153 crosses line 8, so it is not safe to connect 9 and 153. (Rules 1 & 2).

Figure 7E:
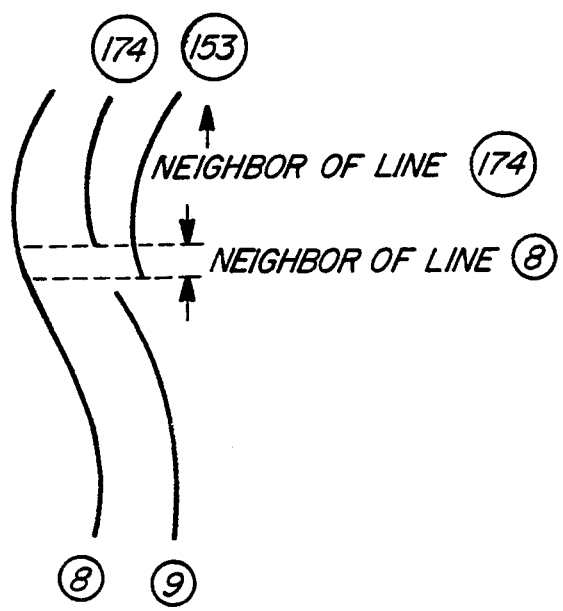

5. The lines to be connected must be neighbors of the common line between them over their entire length or the length of the common line, whichever is shorter. Example: in FIG. 7e, even though lines 9 and 153 have neighbor 8, line 153 should not be connected because line 174 is the neighbor of line 8 over most of the length of 153. (Rule 2)

Every constraint is not explicitly applied to every rule since some rules handle them implicitly and some rules are designed to handle exceptions to constraints. All of the rules except number 4 operate in two modes. They correspond to the two modes of the neighbor finding function. In the first mode (mode 1) connections are attempted by using neighbors of opposite types while in the second mode the same type neighbors are used. The second mode (mode 2) is useful for bridging gaps where either peaks or valleys are not clear.

Meta Rule. A meta rule applies the rules in a manner designed to make the "most obvious" connections first so they will provide further constraints to guide the more difficult decisions made later. The process is as follows:

Step 1: Call rule 3, mode 1; rule 1, mode 1; rule 2, mode 2; rule 2, mode 1. Repeat until no further connections can be made.

Step 2: Call rule 4.

Step 3: Relax the constraints about the length of lines and the number of rows in which they must be neighbors. For example, in Rule 2 the length of lines may be reduced to 7 or 8 pixels and in Rule 3 the endpoints may be 3 or 4 pixels apart. Repeat the calling sequence of Step 1.

Step 4: For each line not connected to any baseline, find the nearest baseline of the same type. Make a connection if the constraints for connection can be met, else discard the line.

Step 5: For each interior free line segment (i.e. an unconnected segment not at the image boundary such as segments 89 and 90 of FIG. 8) longer than a minimum length, start at its midpoint and scan right and left. Record the lines crossed until pixels marked "originally existing" are encountered on each side. Check for the sequence: "originally existing," "unconnected," "created in connection," "originally existing." More than one "unconnected" or "created in connection" line may occur in the sequence. Using standard constraints, check if the unconnected line may have been missed and should be substituted for the "created" pixels. The sequence may also occur in the reverse order.

Figure 8:
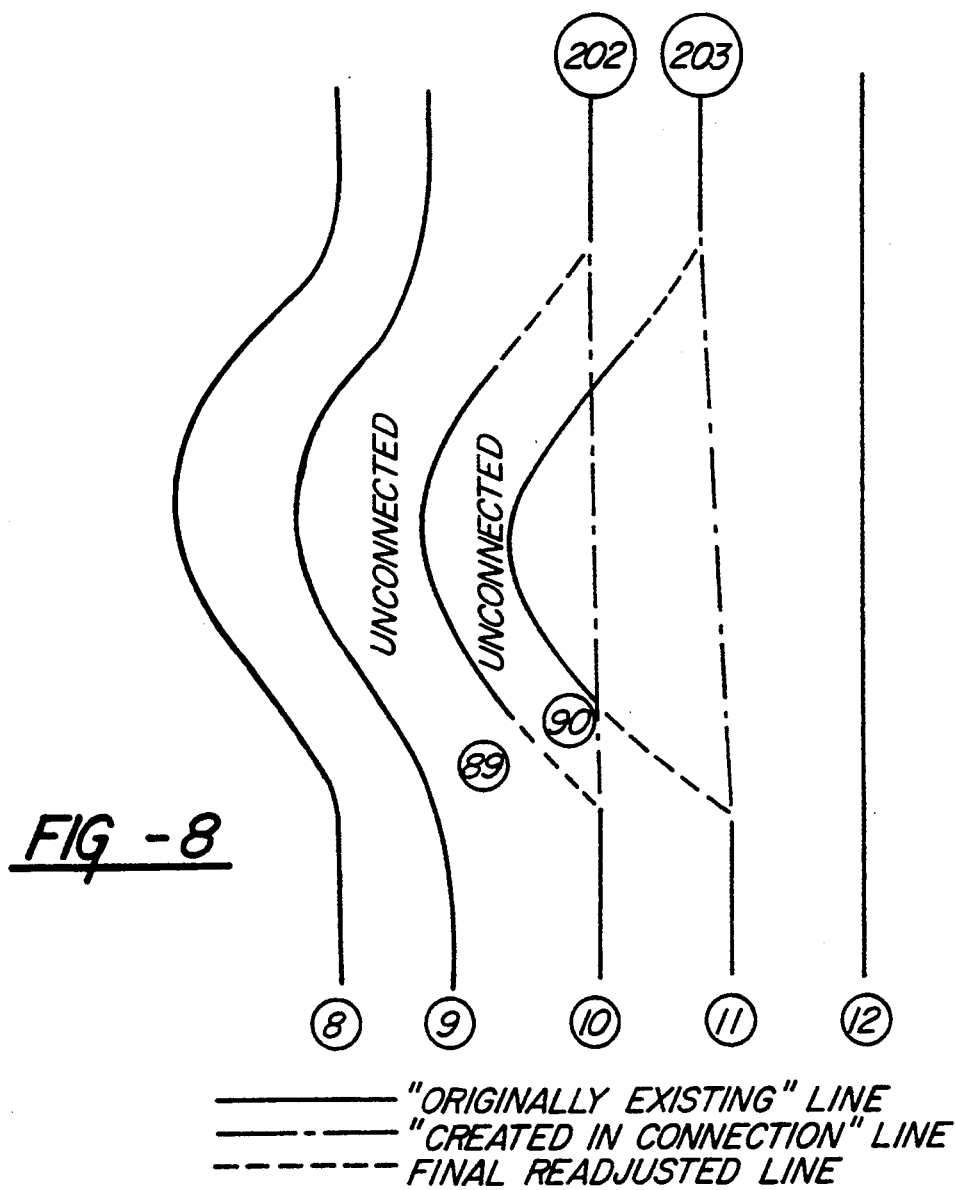
FIG. 8 is a graphical illustration of a line connection rule according to the invention.

A typical application of step 5 is shown in FIG. 8. Lines 10 and 11 were connected to 202 and 203 because of line 12. From lines 8 and 9 it is obvious that the connection should have been 10-89-202 and 11-90-203. By the method of step 5 the points in lines 89 and 90 will be substituted in for the dashed "connection points".

Postprocessing. Some postprocessing is necessary to give uniformity to the results. All of the rows are scanned to find crossing lines. When they are found the offending points are removed from the lines. This process creates gaps in addition to those that may already exist. As the rows are scanned a second time, rows with the missing points are filled in by interpolation. Also, any line that is not as long as lines on either side of it is extended by the same process. Finally, each line contains one point in each row from its beginning to its end. The last operation is to smooth the lines with a vertical 1×7 averaging filter to improve the continuity of the 3-D information because the connection of lines that have deviated from the true positions may generate jagged edges at some points.

Figure 9A:
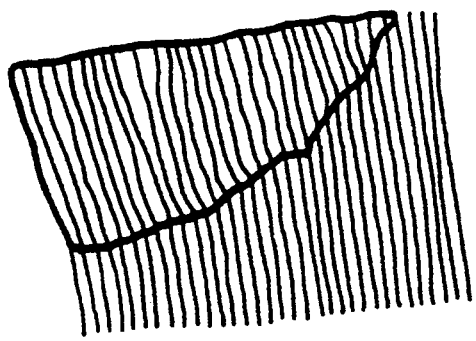
FIGS. 9a and 9b are final processed line images corresponding to the images of FIGS. 4a and 4b, respectively.
Figure 9B:
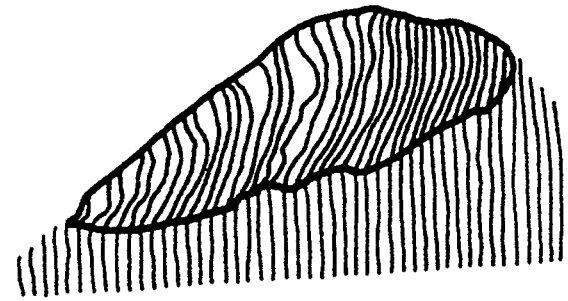

Given a low quality image, the high and low intensity points are labeled correctly and combined into lines as shown in FIGS. 9a and 9b which accurately track the true stripes and shadows on the object. It is essential that any lines on the output image do not shift between stripes on the source image. This would generate wrong deviations of the lines which cause gross errors in the characterization of the object. With the use of intelligent decision making from start to finish this situation can be prevented.

Figure 10A:
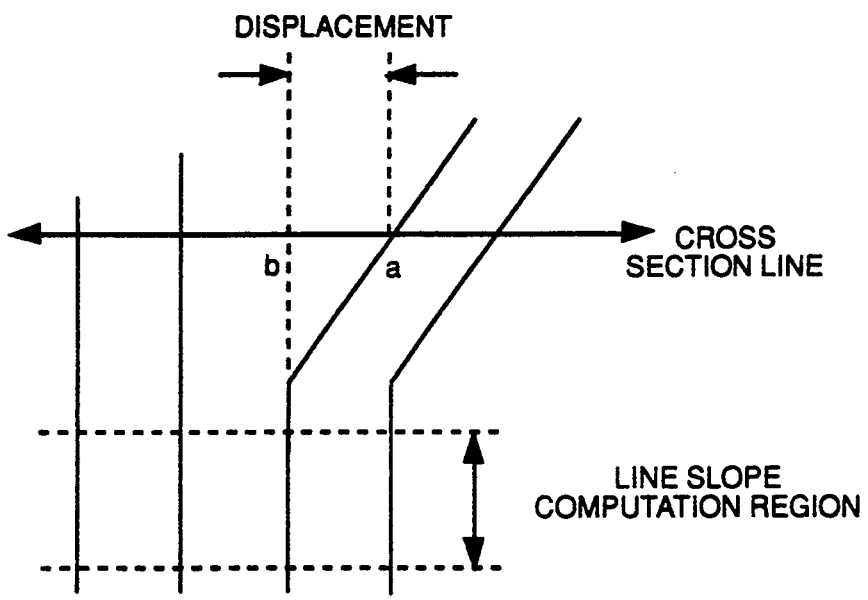
FIGS. 10a and 10b are diagrams of image geometry for calculation of tool wear area and depth.

Characterization of Tool Wear. Once the stripes and shadows have been tracked, they are transformed into a 3-dimensional model so measurements such as area and volume can be made and contour images can be generated. The stripes are read into the appropriate data structures from the image. The average of slopes of lines over the first 40 rows is computed (FIG. 10a). This is the slope of all the parallel lines if they were on a perfectly flat surface. Also, the true starting point of each line is found by averaging over the 40 rows. Then, the expected position b of every point can be computed as if the object were a flat surface.

First, the area of the worn region is measured. As each line is traced, the expected position b of the line at each row is computed and compared with the actual position a of the line. All points that show greater than two pixels difference are marked "worn." The worn pixels should form a continuous string in the lines that traverse worn areas on the object. The bottoms and tops of neighbor strings are connected so that a closed boundary (see FIGS. 9a and 9b) is formed about the entire worn region of a cutting tool and the worn area is computed.

Figure 10B:
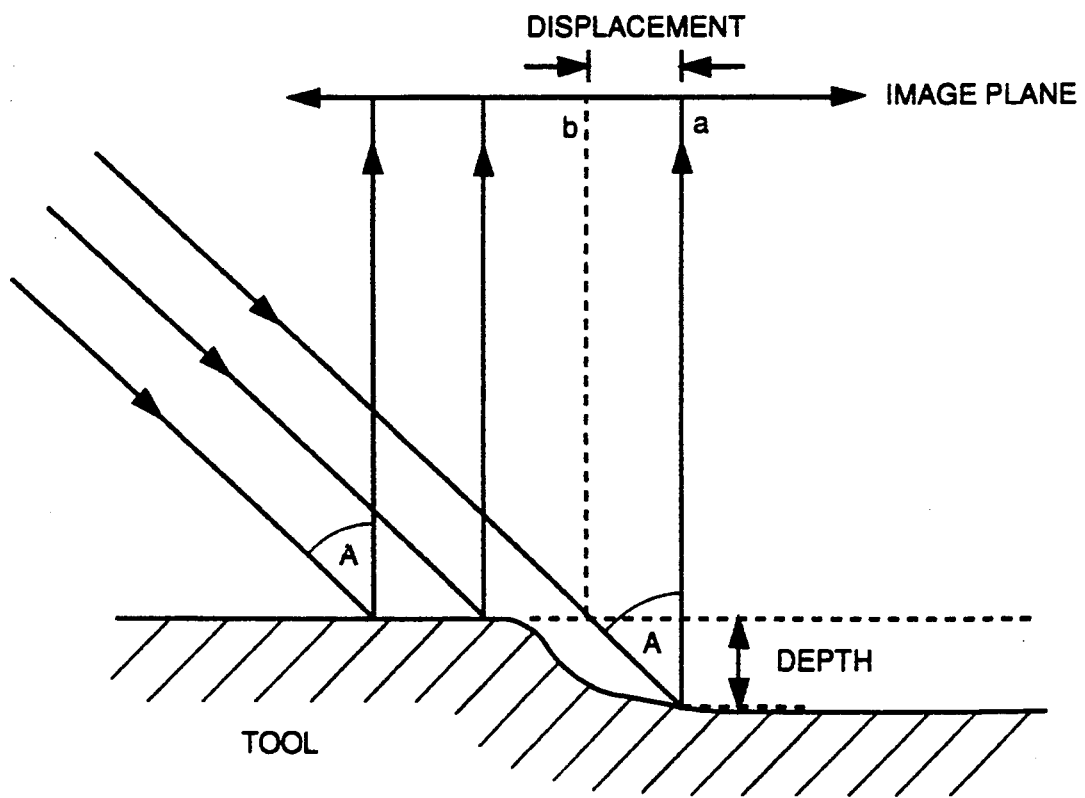

The next measurement is the volume worn out of the tool. As illustrated in FIG. 10b, for each line, the depth at each point is calculated with the following equation:

$$depth = cot(A) * (a-b),$$

where 'A' is the angle between the stripe projector and the camera and a and b are the actual and expected position of the point. After the depths of all the points on every line are computed, linear interpolation is used to compute the depth of points between two lines. The wear volume is computed by summation of volume elements.

Calibration. Accurate calibration is necessary to convert the area and volume measurements to engineering units. After acquiring an image of a grid of known size, a simple global threshold is applied. First the aspect ratio is determined inside of each square. Using the ratio, the true angular rotation of the grid is computed. Then, the distance between centers of adjacent squares on the grid is used to get the horizontal and vertical size of a pixel. Once the pixel size is determined, the image of a test piece is digitized to determine the exact angle between the camera and the projected light. It has two parallel planes with a smooth slope between them. Since the true depth between the surfaces is known, the accurate projection angle can be calculated using the same software which measures the depth. This is necessary because the final volume computations are sensitive to this angle.

The algorithms have been tested on several images of different types of tools. In cases where the resulting 3-D model could be visually compared to the actual object with the help of a magnifying glass or microscope, it was evident that the main features of the wear had been accurately captured.

A number of variables affect the accuracy of the resulting model. The first is image quality. When the contrast between stripes and shadows is minimal the tracing of the lines tends to wander about the true center of the lines, which will yield wrong depth. The proper spacing between stripes in the image is another important parameter. If there are less than 10 pixels between stripes (only 5 pixels between peak and valley), the algorithm may easily jump between lines and yield incorrect results. Increasing this too much will result in an imprecise measurement that ignores small details. Fifteen to 20 pixels seems to be an acceptable range for the wear measurement. Variations and distortions in the pattern projection and viewing system must be taken into consideration. Line thickness and grid accuracy of a calibration grid are also important. Finally, measurement of the angle between the light and the camera should be accurate. If the true angle is 45°, a 1° error will alter the computed volume by 3.5%. This angle may need to be increased to increase the line spacing in objects with shallow wear since this will emphasize the bending of lines. However, the angle may need to be decreased if the object has large variations since both the light and the camera must be able to "see" every part of the object. All of these cause a large variance in numeric results for arbitrary objects, but a careful set up for tool wear and repeated measurements can eliminate much of this.

It will be apparent that once set up in conjunction with a machine tool, the tool can be periodically examined by automatically presenting the tool to the lighting arrangement and camera and the wear area and volume will be measured and reported without human interaction.

The embodiments of the invention in which an exclusive property or privilege is claimed are defined as follows:

1. The method of measuring wear of a cutting tool comprising the steps of:

projecting stripes of light having uniform slope and spacing onto the surface of the cutting tool at a first angle to illuminate a worn portion as well as an unworn planar portion, wherein the stripes of light on the unworn planar portion viewed from a second angle are straight and uniform;

sensing an image of the stripes of light projected on the surface of the tool from the second angle whereby due to noise the image comprises unconnected line segments, constructing from the unconnected line segments complete lines extending across the worn and unworn portions, whereby in the image the lines on the worn portion are offset as a function of the depth of wear and the said angles;

calculating straight reference lines in the worn portion that are extensions of the completed lines on the unworn portion; and measuring an offset distance of the completed lines in the worn portion from the calculated straight reference lines to extract depth of wear information.

2. The invention as defined in claim 1 wherein an area of the worn portion is identified by the offset lines and including the step of;

measuring a volume of wear from the depth of wear information for local volume elements of the worn portion.

3. The invention as defined in claim 1 wherein the step of constructing complete lines from the unconnected line segments comprises the steps of:

determining a pitch of the unconnected line segments in the unworn portion;

filling in points between ends of unconnected line segments on the basis of existing adjacent lines and the determined pitch of unconnected line segments.

4. The invention as defined in claim 1 wherein the image comprises alternating light peaks and dark valleys, and the step of constructing complete lines comprises the further steps of:

extracting lines and line segments of both a peak type and a valley type by thresholding the image along rows transverse to the lines and line segments to select peak and valley points, and creating the lines and line segments by combining strings of points of the same type;

for each extracted line and line segment, finding extracted lines and line segments that are adjacent thereto by scanning on each side of each peak and valley point; and connecting the extracted line segments of the same type according to the amount of separation and the relationship of each extracted line segment to the adjacent extracted lines and line segments.

5. The invention as defined in claim 4 wherein the step of finding extracted lines and line segments that are adjacent comprises:

scanning each side of each point on a given line until a line of a given type, either peak or valley, is found;

if the found line is the same as that found in the previous row, incrementing the number of times it has been found and calculating its average distance from the given line;

if the found line is different, adding it to an adjacent line list, and designating the previous line an adjacent line if it has been found in a preset number of consecutive rows, and otherwise discarding the previous line.

6. The invention as defined in claim 1 wherein the step of projecting stripes of light comprises:

producing a coherent light beam;

splitting the beam into two paths of equal lengths;

recombining the two paths into a combined beam with one path at a slight angle to the other to produce light and dark stripes due to interference of the two paths; and projecting the combined beam onto the surface to illuminate the surface with stripes of light.

7. The method of measuring the three dimensional profile of a contoured object relative to a reference plane comprising the steps of:

projecting stripes of light having uniform slope and spacing onto the surface of the object and the reference plane at a first angle to illuminate the object as well as the plane, wherein the stripes of light on the reference plane viewed from a second angle are straight and uniform;

sensing an image of the stripes from the second angle whereby the image comprises unconnected line segments due to noise, constructing from the unconnected line segments complete lines extending across the object and the reference plane whereby in the image the lines of the object are locally displaced as a function of the distance from the reference plane;

calculating straight reference lines in the object that are extensions of the completed lines on the reference plane; and measuring the displacement of the completed lines in the object from the straight calculated reference lines to extract profile information.

8. The invention as defined in claim 7 wherein the reference plane is a background plane separate from the object.

9. The invention as defined in claim 7 wherein the reference plane is a planar surface on the object.

10. The invention as defined in claim 7 wherein the step of constructing complete lines comprises the further steps of:

extracting lines and line segments by thresholding the image along rows transverse to the lines and line segments to select line points, and creating the lines and line segments by combining strings of line points;

for each extracted line and line segment, finding extracted lines and line segments that are adjacent thereto by scanning on each side of each line point; and connecting the extracted line segments according to the amount of separation and the relationship of each extracted line segment to adjacent extracted lines and line segments.

11. The invention as defined in claim 7 wherein the step of projecting stripes of light comprises:

producing a coherent light beam;

splitting the beam into two paths of equal lengths;

recombining the two paths into a combined beam with one path at a slight angle to the other to produce light and dark stripes due to interference of the two paths; and projecting the combined beam onto the surface to illuminate the surface with stripes of light.

12. A method of measuring wear of a cutting tool having a worn portion and an unworn planar portion, comprising the steps of:

projecting a striped pattern of light onto the surface of the cutting tool at a first angle to illuminate each of the worn and unworn planar portions with multiple common stripes of light, wherein the stripes of light viewed from the first angle are straight and uniform and the stripes of light on the unworn planar portion viewed from a second angle are straight and uniform;

sensing an image of the surface of the cutting tool from the second angle, the sensed image comprising image lines, each of which corresponds to a respective strip of light on the surface of the cutting tool, each image line having a first line portion corresponding to a respective one of the stripes of light on the unworn planar portion of the tool and a second line portion extending from the first line portion corresponding to said respective one of the stripes of light on the worn portion of the tool;

calculating a straight line extension of each first line portion of the image lines into the worn portion; and measuring an offset distance of the straight line extension and the second line portions as a measure of depth of wear.

* * * * *